US012654868B2

(12) United States Patent
Cassagne et al.

(10) Patent No.: US 12,654,868 B2
(45) Date of Patent: Jun. 16, 2026

(54) AIRCRAFT COMPRISING AT LEAST ONE WING MOUNT SYSTEM, WHICH COMPRISES AT LEAST ONE LATERAL CONNECTING ROD

(71) Applicant: Airbus Operations SAS, Toulouse (FR)

(72) Inventors: Jérôme Cassagne, Toulouse (FR);
Thomas Deforet, Toulouse (FR);
Quentin Pasnon, Toulouse (FR);
Romain Molina, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/213,324

(22) Filed: May 20, 2025

(65) Prior Publication Data

US 2025/0368340 A1     Dec. 4, 2025

(30) Foreign Application Priority Data

May 30, 2024     (FR) ...................................... 2405613

(51) Int. Cl.
B64D 27/12     (2006.01)
B64D 27/40     (2024.01)
(52) U.S. Cl.
CPC ........... B64D 27/402 (2024.01); B64D 27/12 (2013.01)

(58) Field of Classification Search
CPC ...... B64D 27/402; B64D 27/40; B64D 29/02; B64D 27/06; B64D 27/12; B64D 27/18
See application file for complete search history.

(56) References Cited

U.S. PATENT DOCUMENTS

| | | | |
|---|---|---|---|
| 6,095,456 A | 8/2000 | Powell | |
| 2016/0244174 A1 | 8/2016 | Pautis et al. | |
| 2022/0127010 A1* | 4/2022 | Pautis | B64D 27/402 |

OTHER PUBLICATIONS

French Search Report for corresponding French Patent Application No. 2405613 dated Nov. 11, 2024.

* cited by examiner

*Primary Examiner* — Ashesh Dangol
(74) *Attorney, Agent, or Firm* — Greer, Burns & Crain, Ltd

(57)     ABSTRACT
An aircraft having at least one wing mount system that connects a wing and a primary structure of a pylon and includes at least first and second wing mounts configured to absorb at least some of the forces and moments and positioned at the upper longitudinal member of the primary structure, at least one lateral connecting rod extending between first and second ends connected respectively to the primary structure and to the wing, the second end being spaced apart at least in the horizontal transverse direction and/or the vertical transverse direction with respect to the primary structure.

9 Claims, 4 Drawing Sheets

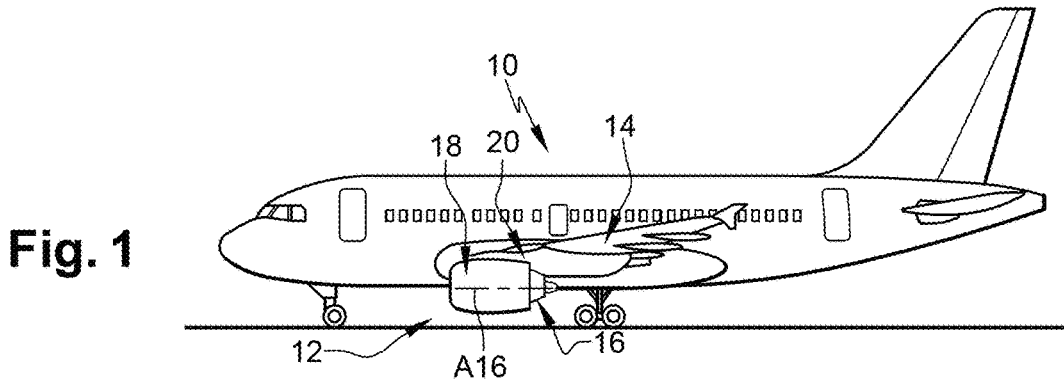
Fig. 1
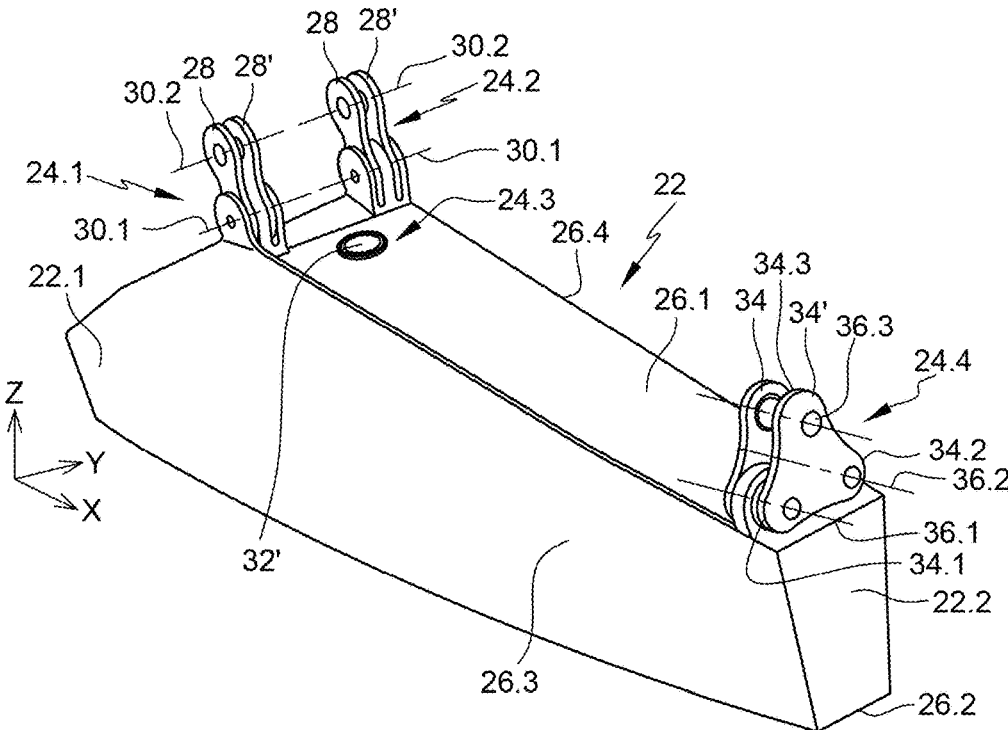
Fig. 2 (prior art)
Fig. 3 (prior art)

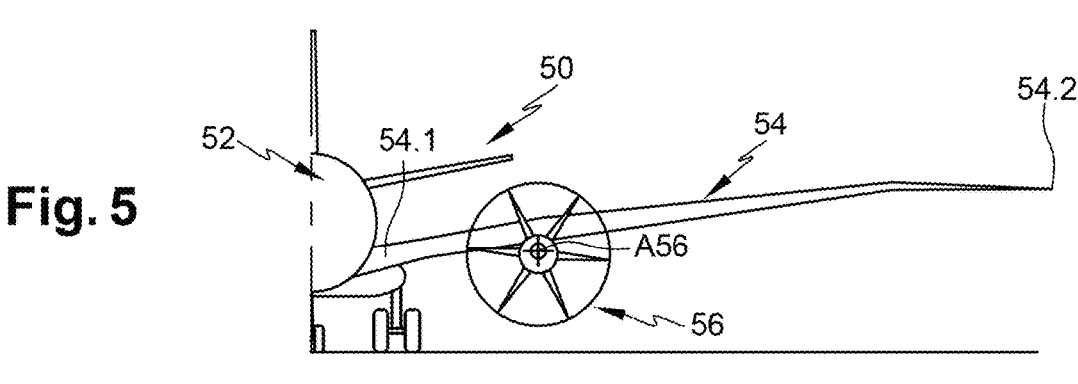
Fig. 4
(prior art)
Fig. 5
Fig. 6
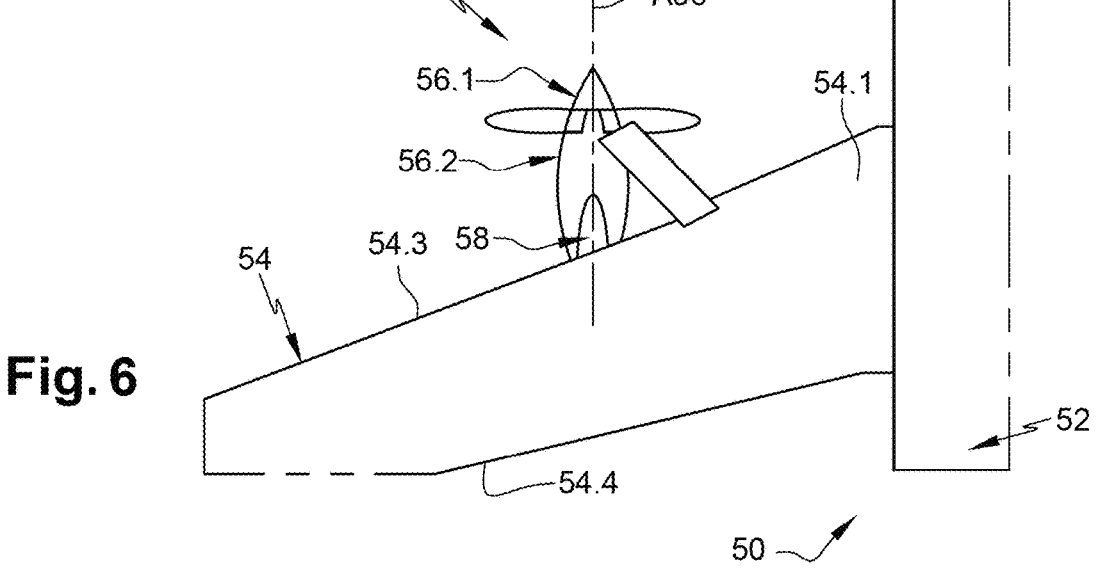

AIRCRAFT COMPRISING AT LEAST ONE WING MOUNT SYSTEM, WHICH COMPRISES AT LEAST ONE LATERAL CONNECTING ROD

CROSS-REFERENCES TO RELATED APPLICATIONS

This application claims the benefit of French Patent Application Number FR2405613 filed on May 30, 2024, the entire disclosure of which is incorporated herein by way of reference.

FIELD OF THE INVENTION

The present application relates to an aircraft comprising at least one wing mount system, which comprises at least one lateral connecting rod.

BACKGROUND OF THE INVENTION

According to one embodiment seen in FIG. 1, an aircraft 10 comprises several propulsion assemblies 12 positioned below the wings 14 of the aircraft. Each propulsion assembly 12 comprises an engine 16, a nacelle 18 positioned around the engine 16 and a pylon 20 connecting the engine 16 and the wing 14.

The pylon 20 comprises a primary structure 22 (seen in FIGS. 2 to 4) connected to the engine 16 by at least one engine mount system and connected to the wing 14 by at least one wing mount system 24.1 to 24.4.

For the purposes of the present invention, a longitudinal direction, denoted X, is substantially parallel to the axis of rotation A16 of the engine 16. A horizontal transverse direction, denoted Y, is a horizontal direction perpendicular to the axis of rotation A16 of the engine 16. A vertical transverse direction, denoted Z, is perpendicular to the axis of rotation A16 of the engine 16. A longitudinal plane is a plane passing through the axis of rotation A16 of the engine 16. A transverse plane is a plane perpendicular to the axis of rotation A16 of the engine 16. The terms front/rear refer to the direction of flow of an air stream in the engine 16 that flows from front to rear.

According to one embodiment seen in FIG. 2, the primary structure 22 extends between front and rear ends 22.1, 22.2 and comprises upper and lower longitudinal members 26.1, 26.2 and right and left side panels 26.3, 26.4.

According to one embodiment seen in FIGS. 2 to 4, the wing mount system 24 comprises first and second front wing mounts 24.1, 24.2, an intermediate wing mount 24.3 and a rear wing mount 24.4.

Each front wing mount 24.1, 24.2 comprises two parallel, closely spaced connecting rods 28, 28' (or shackles), each of which has a first end connected by a first connecting element 30.1 to the primary structure 22 and a second end connected by a second connecting element 30.2 to the wing 14. These first and second connecting elements 30.1, 30.2 have pivot axes substantially parallel to the horizontal transverse direction Y.

The intermediate wing mount 24.3 comprises a shear pin 32 that fits into a housing (ball joint) 32' of the primary structure 22. The shear pin 32 and the housing 32' form a pivoting connection with a pivot axis substantially parallel to the vertical transverse direction Z.

The rear wing mount 24.4 comprises two triangular plates 34, 34', parallel to each other and closely spaced, each having first and second vertices 34.1, 34.2 connected by connecting elements 36.1, 36.2 to the primary structure 22 and a third vertex 34.3 connected by a connecting element 36.3 to the wing 14. These connecting elements 36.1, 36.2, 36.3 have axes oriented substantially in the X direction.

According to one embodiment seen in FIG. 4, the wing 14 comprises a front longitudinal member 38.1, a rear longitudinal member 38.2 and ribs 40 connecting the front and rear longitudinal members 38.1, 38.2.

According to one arrangement, the front wing mounts 24.1, 24.2 are positioned at the front of the front longitudinal member 38.1, substantially in the extension of two ribs 40. The intermediate and rear wing mounts 24.3, 24.4 are positioned between the front and rear longitudinal members 38.1, 38.2 and between two ribs 40. The wing 14 also comprises an intermediate stiffener 42 to which the rear wing mount 24.4 is connected, said intermediate stiffener 42 connecting two ribs 40 and being positioned between the front and rear longitudinal members 38.1, 38.2.

According to this embodiment, the vertical forces (substantially parallel to the vertical transverse direction Z) are absorbed by the front wing mounts 24.1, 24.2 and the rear wing mount 24.4. The rear wing mount 24.4 also absorbs the lateral forces in the direction Y. The horizontal forces oriented in the directions X and Y are absorbed by the intermediate wing mount 24.3.

First moments My oriented about the horizontal transverse direction Y are absorbed by the front and rear wing mounts 24.1, 24.2, 24.4. Second moments Mz oriented in the vertical transverse direction Z are absorbed by the intermediate and rear wing mounts 24.3 and 24.4. Given the relatively large distance between the front wing mounts 24.1, 24.2 and the rear wing mount 24.4, the moment My induces relatively low forces between the primary structure 22 and the wing 14. Given the relatively large distance between the intermediate wing mount 24.3 and the rear wing mount 24.4, the moment Mz induces relatively low forces between the primary structure 22 and the wing 14.

Third moments Mx oriented in the longitudinal direction X are absorbed by the two front wing mounts 24.1, 24.2. Given the small spacing between the front wing mounts 24.1, 24.2, the third moments Mx induce relatively high forces between the primary structure 22 and the wing 14, making it necessary to reinforce the front wing mounts 24.1, 24.2.

To reduce the forces induced by the third moments Mx at the front wing mounts 24.1, 24.2, one solution is to increase the separation of the front wing mounts 24.1, 24.2. However, this solution is unsatisfactory because it results in the pylon becoming wider, which reduces the aerodynamic performance of the aircraft.

SUMMARY OF THE INVENTION

The present invention aims to resolve some or all of the disadvantages of the prior art.

To this end, the subject of the invention is an aircraft comprising a fuselage, wings extending on either side of the fuselage, and propulsion assemblies positioned below the wings and connected thereto by pylons, each propulsion assembly comprising an engine having an axis of rotation, each pylon comprising a primary structure connected to one of the wings by at least one wing mount system and connected to the engine by at least one engine mount system, the primary structure comprising at least one upper longitudinal member and having a maximum width, the wing mount system comprising at least first and second wing mounts offset in a longitudinal direction parallel to the axis of rotation of the engine and configured to ensure at least partial absorption of forces oriented in and moments oriented about the longitudinal direction and in/about horizontal and vertical transverse directions perpendicular to each other and to the longitudinal direction, the first and second wing mounts being positioned at the upper longitudinal member of the primary structure.

According to the invention, the wing mount system comprises:

front wing mount comprising at least one connecting element having a pivot axis, positioned in a vertical longitudinal plane, forming a reduced angle with the longitudinal direction, an intermediate wing mount comprising at least one connecting element having a pivot axis forming a reduced angle with the horizontal transverse direction, a rear wing mount comprising at least one connecting element having a pivot axis, positioned in a vertical longitudinal plane, forming a reduced angle with the longitudinal direction, at least one lateral connecting rod extending between first and second ends, the first end being connected to the primary structure, the second end being connected to the wing and spaced apart at least in the horizontal transverse direction and/or in the vertical transverse direction with respect to the primary structure.

This lateral connecting rod generates a second path for forces between the engine and the wing, thereby reducing the stresses applied to the primary structure of the pylon. This lateral connecting rod also stiffens the propulsion assembly to solve problems of displacement or dynamics. It can be installed on isostatic or hyperstatic wing/pylon interfaces. Thanks to the lateral connecting rod, it is possible to reduce the width of the primary structure while limiting the forces induced by the moments on the primary structure and/or the wing.

According to another feature, the second end is spaced apart at least in the horizontal transverse direction and in the vertical transverse direction with respect to the primary structure.

According to another feature, the second end of the lateral connecting rod is offset upwards in the vertical transverse direction with respect to the first end and closer to the fuselage in the transverse direction with respect to the first end.

According to another feature, the second end of the lateral connecting rod is spaced apart from the primary structure by a distance greater than the maximum width of the primary structure.

According to another feature, the first end is offset in the vertical transverse direction downwards with respect to the upper longitudinal member of the primary structure.

According to another feature, each wing comprises front and rear longitudinal members and a plurality of ribs connecting the front and rear longitudinal members. In addition, the second end of the lateral connecting rod is connected to the front longitudinal member and to a rib of the wing.

According to another feature, the first and second wing mounts are connected to a different rib to the rib to which the lateral connecting rod is connected.

According to another feature, the first end of the lateral connecting rod is positioned in a transverse plane located in front of the front wing mount.

According to another feature, the lateral connecting rod has a hollow body for housing at least one of a fluid pipe and an electrical cable, which extends between the wing and the primary structure.

4

BRIEF DESCRIPTION OF THE DRAWINGS

Other features and advantages will be apparent from the following description of the invention, which is given by way of example only, with reference to the appended drawings, in which:

FIG. 1 is a lateral view of an aircraft,

FIG. 2 is a perspective view of a primary structure of an aircraft pylon showing a prior art embodiment, FIG. 3 is a schematic side view of a wing mount system showing a prior art embodiment, FIG. 4 is a schematic view, from above, of a wing mount system showing a prior art embodiment, FIG. 5 is half of a front view of an aircraft showing one embodiment of the invention, FIG. 6 is a view, form above, of a wing and of a propulsion assembly showing an embodiment of the invention.

DETAILED DESCRIPTION OF THE PREFERRED EMBODIMENTS

Figure 7:
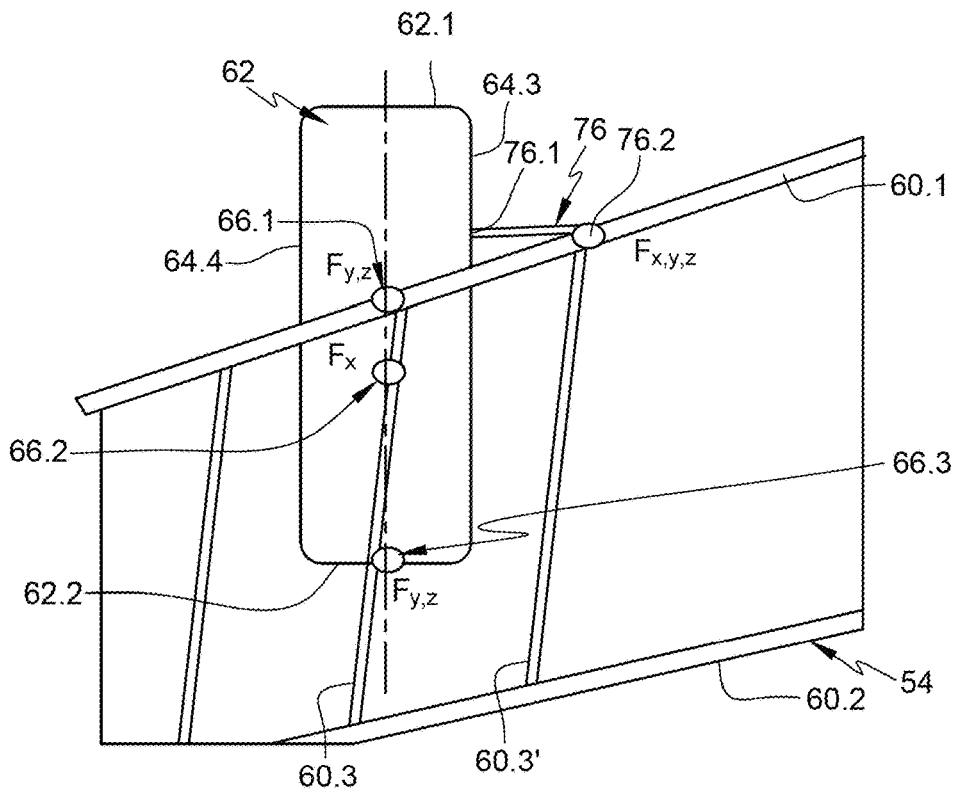
FIG. 7 is a schematic view, from above, of a rear wing mount system showing an embodiment of the invention.

According to one embodiment seen in FIGS. 5 and 6, an aircraft 50 comprises a fuselage 52, wings 54 extending on either side of the fuselage 52, and propulsion assemblies 56 positioned under the wings 54 and connected thereto by pylons 58.

According to one configuration, each wing 54 extends between a first end 54.1 connected to the fuselage 52 and a second, free end 54.2 remote from the fuselage 52. Each wing 54 has a leading edge 54.3 and a trailing edge 54.4. As shown in FIG. 7, structurally the wing 54 comprises a front longitudinal member 60.1 substantially parallel to and close to the leading edge 54.3, a rear longitudinal member 60.2 substantially parallel to and close to the trailing edge 54.4 and a plurality of ribs 60.3 connecting the front and rear longitudinal members 60.1, 60.2.

According to one configuration, each propulsion assembly 56 comprises an engine 56.1, which has an axis of rotation A56, such as a turbojet or turboprop, for example, and a nacelle 56.2 in which the engine 56.1 is positioned.

The longitudinal direction X is parallel to the axis of rotation A56 of the engine 56.1. The horizontal and vertical transverse directions Y, Z are perpendicular to each other and to the longitudinal direction X.

The wings 54 and the propulsion assemblies 56 are not described further, as they may be identical to those of the prior art.

The pylon 58 comprises a primary structure 62 (seen in FIGS. 7 to 11) connecting the engine 56.1 and one of the wings 54, which extends between front and rear ends 62.1, 62.2. According to one configuration, the primary structure 62 is a box structure and comprises upper and lower longitudinal members 64.1, 64.2 and right and left side panels 64.3, 64.4. Of course, the invention is not limited to this configuration for the box structure 62. The primary structure 62 has a maximum width L62 corresponding to the distance separating the right and left side panels 64.3, 64.4. Whatever the embodiment, the primary structure 62 comprises at least one upper longitudinal member 64.1 and has a maximum width L62.

The aircraft 50 comprises at least one engine mount system connecting the primary structure 62 and the engine 56.1, as well as at least one wing mount system 66 connecting the primary structure 62 and the wing 54.

According to one embodiment, this wing mount system 66 comprises a front wing mount 66.1, an intermediate wing mount 66.2 and a rear wing mount 66.3, these being offset in the longitudinal direction X, as well as at least one lateral connecting rod 76, the function of which will be described later.

The rear wing mount 66.3 is configured to absorb forces between the wing 54 and the primary structure 62 in the horizontal and vertical transverse directions Y, Z. According to one configuration, the rear wing mount 66.3 comprises two triangular plates 68, 68', parallel to each other and closely spaced, each having first and second vertices 68.1, 68.2 connected by connecting elements 70.1, 70.2 to the primary structure 62 and a third vertex 68.3 connected by a connecting element 70.3 to the wing 54. These connecting elements 70.1, 70.2, 70.3 have pivot axes parallel to each other and positioned in vertical longitudinal planes XZ. This rear wing mount 66.3 is not described further as it may be identical to those of the prior art. However, the invention is not limited to this configuration for the rear wing mount 66.3. Whatever the embodiment, the rear wing mount 66.3 comprises at least one connecting element 70.3 having a pivot axis, positioned in a vertical longitudinal plane XZ, forming a reduced angle with the longitudinal direction X.

For the purposes of the present application, reduced angle means an angle of less than 10°.

According to one arrangement, the rear wing mount 66.3 and more specifically the connecting element 70.3 are connected to a first rib 60.3. The rear wing mount 66.3, more specifically the connecting elements 70.1, 70.2, are positioned above the upper longitudinal member 64.1 of the primary structure 62 and/or connected to the upper longitudinal member 64.1.

The intermediate wing mount 66.2 is configured to absorb forces between the wing 54 and the primary structure 62 in the longitudinal direction X. According to one configuration, the intermediate wing mount 66.2 comprises a clevis 72.1 secured to a first of the elements that are the wing 54 and the primary structure 62, a lug 72.2 secured to a second, different from the first, of the elements that are the wing 54 and the primary structure 62, and a connecting element 72.3 passing through the clevis 72.1 and the lug 72.2 and having a pivot axis oriented in the transverse and horizontal direction Y. According to one embodiment, the clevis 72.1 comprises two wings substantially parallel to each other and closely spaced apart, between which the lug 72.2 is positioned. The wings of the clevis 72.1 and the lug 72.2 are positioned in vertical longitudinal planes XZ and each comprise a through-hole for housing the connecting element 72.3. The connecting element comprises a cylindrical body housed in the through-holes of the wings of the clevis 72.1 and of the lug 72.2, forming with the wings of the clevis 72.1 a pivoting connection with a pivot axis oriented in the horizontal transverse direction Y. According to one variant, the cylindrical body of the connecting element 72.3 forms with the lug 72.2 a pivoting connection having a pivot axis oriented in the horizontal transverse direction Y. Alternatively, the cylindrical body of the connecting element 72.3 forms a ball joint with the lug 72.2.

Figure 9:
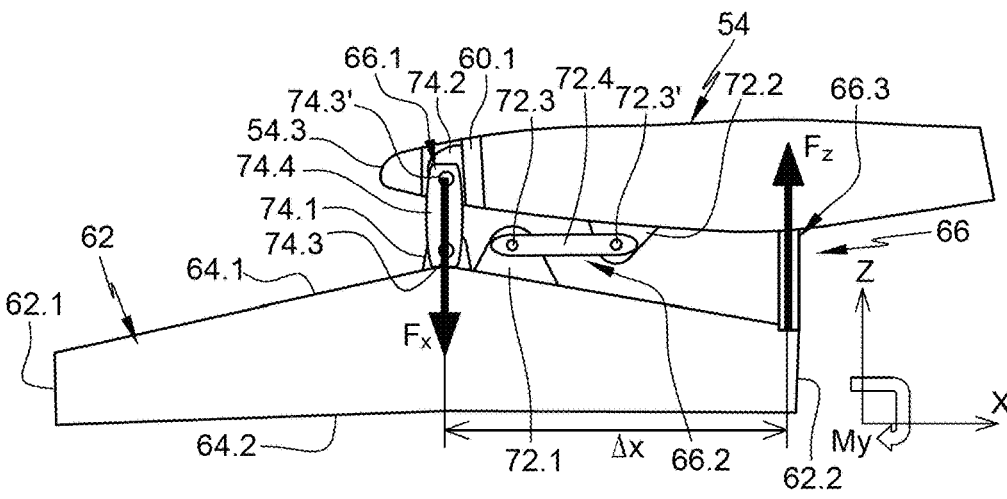
FIG. 9 is a schematic side view of a wing mount system showing an embodiment of the invention.

According to another configuration seen in FIG. 9, the intermediate wing mount 66.2 comprises a first clevis 72.1 secured to the primary structure 62, a second clevis 72.2 secured to the wing 54, a connecting rod 72.4, a first connecting element 72.3 connecting the connecting rod 72.4 and the first clevis 72.1 and a second connecting element 72.3' connecting the connecting rod 72.4 and the second clevis 72.2. The first and second connecting elements 72.3, 72.3' may form pivoting connections or be associated with ball joints to form pivoting ball joint connections.

However, the invention is not limited to these configurations for the intermediate wing mount 66.2. Whatever the embodiment, the intermediate wing mount 66.2 comprises at least one connecting element 72.3 having a pivot axis forming a reduced angle with the horizontal transverse direction Y.

According to one arrangement, the intermediate wing mount 66.2 is connected to the first rib 60.3. The intermediate wing mount 66.2 is positioned above the upper longitudinal member 64.1 of the primary structure 62 and/or connected to the upper longitudinal member 64.1.

The front wing mount 66.1 is configured to absorb forces between the wing 54 and the primary structure 62 in the horizontal and vertical transverse directions Y, Z. According to one configuration, the front wing mount 66.1 comprises a clevis 74.1 secured to a first of the elements that are the wing 54 and the primary structure 62, a lug 74.2 secured to a second, different to the first, of the elements that are the wing 54 and the primary structure 62, as well as a connecting element 74.3 passing through the clevis 74.1 and the lug 74.2 and having a pivot axis oriented in the longitudinal direction X. According to one embodiment, the clevis 74.1 comprises two wings substantially parallel to each other and closely spaced apart, between which the lug 74.2 is positioned. The wings of the clevis 74.1 and the lug 74.2 are positioned in transverse planes YZ and each comprise a through-hole for housing the connecting element 74.3. The connecting element comprises a cylindrical body housed in the through-holes of the wings of the clevis 74.1 and of the lug 74.2, forming with the wings of the clevis 74.1 a pivoting connection with a pivot axis oriented in the longitudinal direction X. According to one variant, the cylindrical body of the connecting element 74.3 forms with the lug 74.2 a pivoting connection with a pivot axis oriented in the longitudinal direction X. Alternatively, the cylindrical body of the connecting element 74.3 forms a ball joint with the lug 74.2.

According to another configuration seen in FIG. 9, the front wing mount 66.1 comprises a first clevis 74.1 secured to the primary structure 62, a second clevis 74.2 secured to the wing 54, a connecting rod 74.4, a first connecting element 74.3 connecting the connecting rod 74.4 and the first clevis 74.1 and a second connecting element 74.3' connecting the connecting rod 74.4 and the second clevis 74.2. The first and second connecting elements 74.3, 74.3' may form pivoting connections or be associated with ball joints to form pivoting ball joint connections.

However, the invention is not limited to these configurations for the front wing mount 66.1. Whatever the embodiment, the front wing mount 66.1 comprises at least one connecting element 74.3 having a pivot axis, positioned in a vertical longitudinal plane XZ, forming a reduced angle with the longitudinal direction X.

According to one arrangement, the front wing mount 66.1 is connected to the front longitudinal member 60.1, substantially in the extension of the first rib 60.3. The front wing mount 66.1 is positioned above the upper longitudinal member 64.1 of the primary structure 62 and/or connected to the upper longitudinal member 64.1.

According to one specific feature of the invention, the wing mount system 66 comprises at least one lateral connecting rod 76 extending between first and second ends 76.1, 76.2, the first end 76.1 being connected to the primary structure 62, the second end 76.2 being connected to the wing 54 and spaced apart at least in the horizontal transverse direction Y and/or in the vertical transverse direction Z with respect to the primary structure 62.

According to one embodiment, the second end 76.2 of the lateral connecting rod 76 is connected to the front longitudinal member 60.1 of the wing 54 and connected to a second rib 60.3' different to and spaced apart from the first rib 60.3. According to one arrangement, the second end 76.2 of the lateral connecting rod 76 is offset in the direction of the first end 54.1 of the wing 54 (that connected to the fuselage 52) with respect to the primary structure 62. According to one configuration, the second end 76.2 of the lateral connecting rod 76 is separated from the primary structure 62 by a distance greater than the maximum width L62 of the primary structure 62, and preferably greater than twice the maximum width L62 of the primary structure 62.

According to one embodiment, the first end 76.1 of the lateral connecting rod 76 is offset in the vertical transverse direction Z downwards with respect to the upper longitudinal member 64.1 of the primary structure 62. According to one arrangement, the first end 76.1 of the lateral connecting rod 76 is connected to the right or left side panel 64.3, 64.4 of the primary structure 62. It is positioned closer to the lower longitudinal member 64.2 than to the upper longitudinal member 64.1 of the primary structure 62. Preferably, the first end 76.1 of the lateral connecting rod 76 is located at the lower longitudinal member 64.2 of the primary structure 62.

Figure 8:
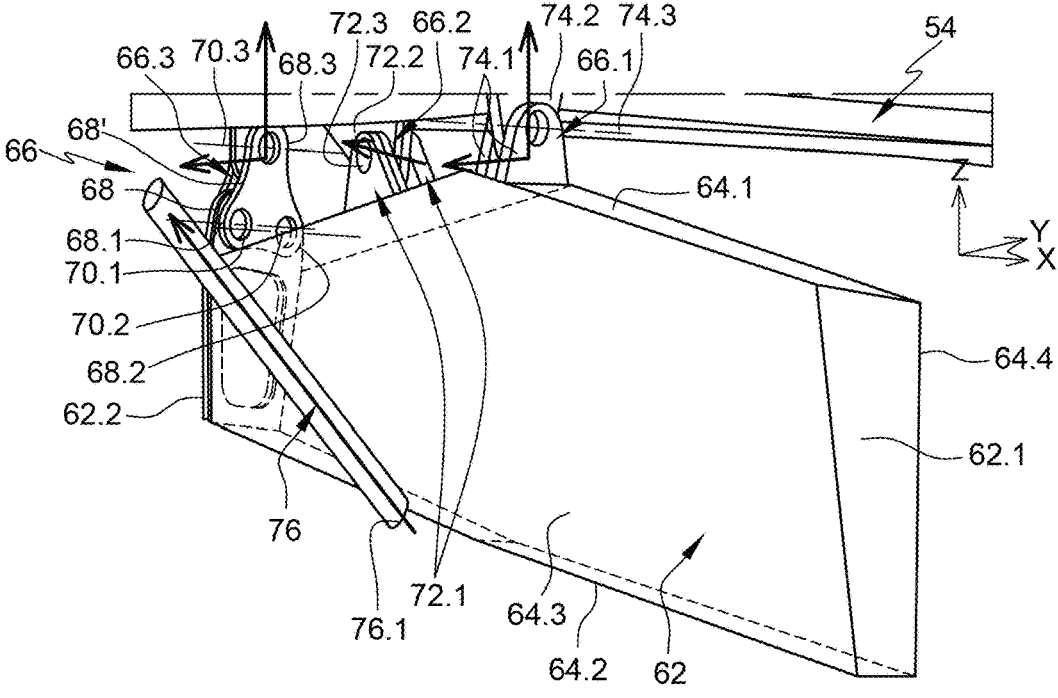
FIG. 8 is a perspective view of a primary structure and of a wing mount system showing an embodiment of the invention.

According to one configuration see in FIGS. 6 and 8, the second end 76.2 is offset upwards in the vertical transverse direction Z with respect to the first end 76.1 and closer to the fuselage 52 in the transverse direction Y with respect to the first end 76.1.

The first end 76.1 of the lateral connecting rod 76 is positioned in a transverse plane located in front of the front wing mount 66.1, as shown in FIG. 7.

According to one embodiment, the lateral connecting rod 76 has a cylindrical body. At least one of the first and second ends 76.1, 76.2 is connected to the wing 54 or connected to the primary structure 62 by a pivoting connection, which may or may not be ball-jointed. The lateral connecting rod 76 is configured to limit its impact on the aerodynamic performance of the aircraft.

According to one configuration, the lateral connecting rod 76 has a hollow body for housing at least one fluid pipe and/or at least one electrical cable, which extend(s) between the wing 54 and the primary structure 62.

Of course, the invention is not limited to these embodiments for the lateral connecting rod 76. The lateral connecting rod may be hollow or solid, have a non-circular cross section and be connected to the wing 54 or to the primary structure 62 by any appropriate means.

According to one arrangement, the lateral connecting rod 76 is configured to absorb forces between the wing 54 and the primary structure 62 in the longitudinal and horizontal and vertical transverse directions X, Y, Z.

As shown in FIG. 9, first moments My oriented about the horizontal transverse direction Y are absorbed by the front and rear wing mounts 66.1, 66.3. Given the relatively large distance between the front and rear wing mounts 66.1, 66.3, the first moments My induce relatively low forces between the primary structure 62 and the wing 54.

Figure 10:
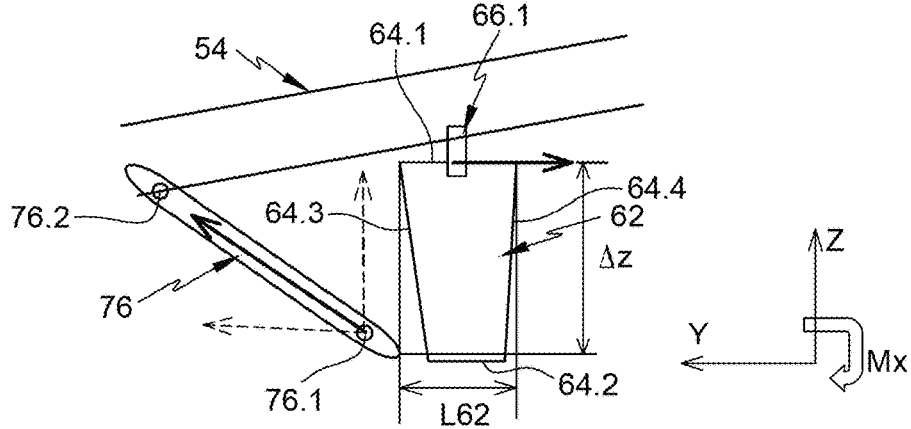
FIG. 10 is a schematic front view of a wing mount system showing an embodiment of the invention.

As shown in FIG. 10, second moments Mx oriented about the longitudinal direction X are absorbed by the lateral connecting rod 76 and the front wing mount 66.1. Given the relatively large distance between the first end 76.1 of the lateral connecting rod 76 and the front wing mount 66.1, the second moments Mx induce relatively low forces between the primary structure 62 and the wing 54. Unlike the prior art, the forces induced by the second moments Mx are not related to the width L62 of the primary structure 62. As a result, it is possible to reduce the width L62 of the primary structure 62 by around 25 to 30% compared with a primary structure of the prior art, while limiting the forces induced by the second moments Mx on the primary structure 62 and the wing 54.

Figure 11:
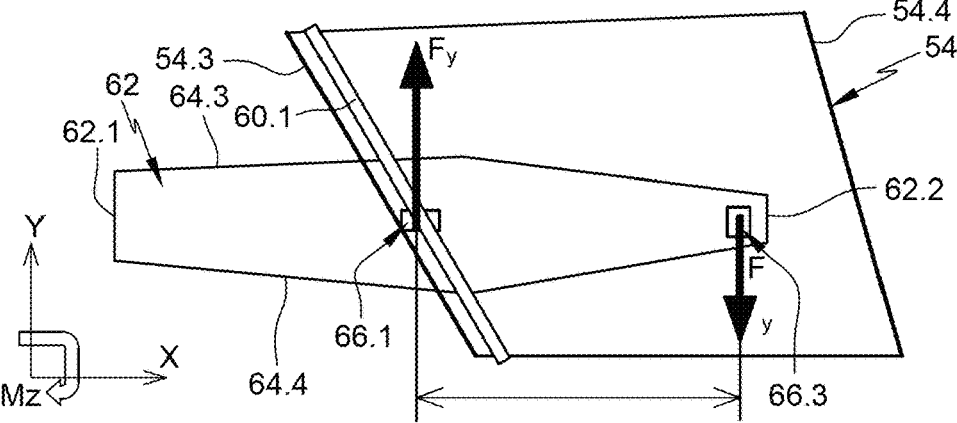
FIG. 11 is a schematic view, from above, of a wing mount system showing an embodiment of the invention.

As shown in FIG. 11, third moments Mz oriented about the vertical transverse direction Z are absorbed by the front and rear wing mounts 66.1, 66.3. Given the relatively large distance between the front and rear wing mounts 66.1, 66.3, the third moments Mz induce relatively low forces between the primary structure 62 and the wing 54.

Of course, the invention is not limited to these embodiments for the wing mount system 66. Whatever the embodiment, the wing mount system 66 comprises at least first and second wing mounts, including a front wing mount 66.1, an intermediate wing mount 66.2, a rear wing mount 66.3, which are configured to at least partially absorb forces oriented in and moments oriented about the longitudinal direction X, horizontal transverse direction Y and vertical transverse direction Z, and are positioned at the upper longitudinal member 64.1 of the primary structure 62. In addition, the wing mount system 66 comprises at least one lateral connecting rod 76 extending between first and second ends 76.1, 76.2, the first end 76.1 being connected to the primary structure 62, the second end 76.2 being connected to the wing 54 and spaced apart at least in the horizontal transverse direction Y and/or in the vertical transverse direction Z with respect to the primary structure 62. According to one embodiment, the second end 76.2 is spaced apart at least in the horizontal and vertical transverse directions Y, Z. According to one configuration, the first and second wing mounts, from among the front wing mount 66.1, the intermediate wing mount 66.2 and the rear wing mount 66.3, are connected to a different rib 60.3 to the rib 60.3' to which the lateral connecting rod 76 is connected.

According to another embodiment, the wing mount system 66 comprises two lateral connecting rods 76 positioned on either side of the primary structure 62.

Thanks to the lateral connecting rod 76, it is possible to reduce the width of the primary structure 62 while limiting the forces induced by the moments Mx, My, Mz on the primary structure 62 and/or the wing 54. In addition, this lateral connecting rod generates a second path for forces between the engine 56.1 and the wing 54, thereby reducing the stresses applied to the primary structure 62 of the pylon. When the lateral connecting rod 76 is offset towards the fuselage 52 it allows forces to be introduced into the wing 54 in an area closer to the fuselage 52 than the rest of the wing mount 66.

Finally, the lateral connecting rod 76 can be used to house at least one fluid pipe and/or at least one electrical cable, thus reducing the clutter in the primary structure 62 of the pylon.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

a fuselage;

two wings, wherein each wing of the two wings extend on a side of the fuselage; and a propulsion assembly positioned below each wing and connected thereto by a pylon, the propulsion assembly comprising an engine having an axis of rotation, the pylon comprising a primary structure connected to the wing by at least one wing mount system and connected to the engine by at least one engine mount system, the primary structure comprising at least one upper longitudinal member and having a width, the at least one wing mount system configured to ensure at least partial absorption of forces oriented in and moment oriented about a longitudinal direction and in, about, or both horizontal and vertical transverse directions perpendicular to each other and to the longitudinal direction, the at least one wing mount system positioned at the at least one upper longitudinal member of the primary structure, and wherein the at least one wing mount system comprises a front wing mount comprising at least one connecting element having a pivot axis, positioned in a first vertical longitudinal plane, forming an angle with the longitudinal direction, an intermediate wing mount comprising at least one connecting element having a pivot axis forming an angle with the horizontal transverse direction, a rear wing mount comprising at least one connecting element having a pivot axis, positioned in a second vertical longitudinal plane, forming an angle with the longitudinal direction, and, at least one lateral connecting rod extending between first and second ends, the first end connected to the primary structure, the second end connected to the wing and spaced apart, at least in the horizontal transverse direction, or in the vertical transverse direction, or in both directions, with respect to the primary structure.

2. The aircraft according to claim 1, wherein the second end of the at least one lateral connecting rod is spaced apart, at least in the horizontal transverse direction and in the vertical transverse direction, with respect to the primary structure.

3. The aircraft according to claim 2, wherein the second end of the at least one lateral connecting rod is offset upwards in the vertical transverse direction with respect to the first end of the at least one lateral connecting rod and closer to the fuselage in the vertical transverse direction with respect to the first end of the at least one lateral connecting rod.

4. The aircraft according to claim 1, wherein the second end of the at least one lateral connecting rod is spaced apart from the primary structure by a distance greater than the width of the primary structure.

5. The aircraft according to claim 1, wherein the first end of the at least one lateral connecting rod is offset downwards in the vertical transverse direction with respect to the at least one upper longitudinal member of the primary structure.

6. The aircraft according to claim 1, wherein each wing comprises front and rear longitudinal members and a plurality of ribs connecting the front and rear longitudinal members, and wherein the second end of the at least one lateral connecting rod is connected to the front longitudinal member and connected to a rib of the plurality of ribs of the wing.

7. The aircraft according to claim 6, wherein at least two of the front wing mount, the intermediate wing mount, and the rear wing mount are connected to ribs of the plurality of ribs other than the rib to which the at least one lateral connecting rod is connected.

8. The aircraft according to claim 1, wherein the first end of the at least one lateral connecting rod is positioned in a vertical transverse plane located in front of the front wing mount.

9. The aircraft according to claim 1, wherein the at least one lateral connecting rod has a hollow body which extends between the wing and the primary structure, the hollow body configured to house a fluid pipe, an electrical cable, or both.

* * * * *